United States Patent [19]

Hiramatsu et al.

[11] Patent Number: 4,676,336
[45] Date of Patent: Jun. 30, 1987

[54] POWER TRANSMISSION APPARATUS FOR VEHICLE

[75] Inventors: Takeo Hiramatsu; Yoshimasa Nagayoshi, both of Kyoto, Japan

[73] Assignee: Mitsubishi Jidosha Kogyo Kabushiki Kaisha, Tokyo, Japan

[21] Appl. No.: 670,903

[22] Filed: Nov. 13, 1984

[30] Foreign Application Priority Data

| Nov. 11, 1983 | [JP] | Japan | 58-210963 |
| Nov. 18, 1983 | [JP] | Japan | 58-217494 |
| Nov. 30, 1983 | [JP] | Japan | 58-225985 |
| Oct. 5, 1984 | [JP] | Japan | 59-207949 |
| Oct. 23, 1984 | [JP] | Japan | 59-222337 |

[51] Int. Cl.$^4$ .................................. B60K 17/34
[52] U.S. Cl. ................................ 180/233; 74/732; 74/733; 180/248
[58] Field of Search ............... 180/233, 247, 248, 249, 180/250; 74/687, 730, 720, 732, 733, 655

[56] References Cited

U.S. PATENT DOCUMENTS

2,872,992  2/1959  Schirmer .................. 180/248 X

Primary Examiner—John A. Pekar

[57] ABSTRACT

In a power transmission apparatus for use in a vehicle of the type in which its front and rear wheels are driven by the same engine, a first rotary shaft transmitting drive force to the front wheels and a second rotary shaft transmitting drive force to the rear wheels are coupled to each other through a hydraulic oil pump which is driven according to the rotation speed difference between the first and second rotary shafts and delivers hydraulic oil of an amount corresponding to the rotation speed difference. The pressure of hydraulic oil delivered from the pump is controlled by hydraulic control means so as to automatically change over between the two-wheel drive mode in which the front or rear wheels only are driven and the four-wheel drive mode in which both the front and rear wheels are driven.

29 Claims, 15 Drawing Figures

POWER TRANSMISSION APPARATUS FOR VEHICLE

TECHNICAL FIELD OF THE INVENTION

This invention relates to a power transmission apparatus for a vehicle of the kind in which its front and rear wheels are driven by the same engine.

TECHNICAL BACKGROUND OF THE INVENTION

In a vehicle of four-wheel drive type in which the front and rear wheels are driven by the same engine, there is a slight difference between the effective radii of the tires of the front and rear wheels or there occurs a difference between the paths of rolling movement of the tires of the front and rear wheels during running along a curve. As a result, the tires tend to slip during running of the vehicle, and an excessive force tends to act upon the drive system of the vehicle. It is therefore necessary to provide effective means for preventing impartation of such an undesirable force to the drive system of the vehicle.

For this purpose, in a vehicle of full-time four-wheel drive type in which all of the four wheels are necessarily driven at the same time, there has been provided a third differential unit commonly called a center differential unit so as to permit transmission of the drive force of the engine to all the wheels even when a rotation speed difference occurs between a first rotary shaft transmitting the drive force to the front wheels and a second rotary shaft transmitting the drive force to the rear wheels. However, the vehicle of full-time four-wheel drive type is disadvantageous from the aspects of weight, size and cost when compared with a vehicle of part-time four-wheel drive type in which all of the four wheels are not necessarily driven at the same time. Also, owing to the capability of the differential rotation of the front and rear wheels, the four-wheel drive may not always be achieved when the four-wheel drive is required, and, in order to ensure the four-wheel drive, a differential locking mechanism is additionally required. Thus, the vehicle of full-time four-wheel drive type has been defective among others in that its power transmission system is complex in structure.

In connection with such a vehicle of full-time four-wheel drive type, a method is disclosed in Japanese Patent Application Laid-open No. 58-20521 (1983). According to the disclosed method, the center differential unit is replaced by a wet type multi-disk clutch disposed in the drive coupling portion, and such a clutch is caused to slide during running of the vehicle along a curve thereby absorbing the rotation speed difference between the front and rear wheels. However, the proposed method has been defective among others in that the wet type multi-disk clutch tends to be damaged by the heat generated due to slippage and that the clutch has a limited torque transmission capacity.

The center differential unit is not usually provided in the vehicle of part-time four-wheel drive type. Accordingly, the driver of the vehicle of this type must make necessary manipulation to drive the two wheels only among the four wheels when a tight corner braking phenomenon peculiar to the four-wheel drive may occur during running of the vehicle along a curve. Therefore, the vehicle of part-time four-wheel drive type has been defective in that the driver must make complicated manipulation for driving the vehicle.

SUMMARY OF THE INVENTION

With a view to obviate all of the prior art defects of vehicles in which the front and rear wheels are driven by the same engine, it is a primary object of the present invention to provide a power transmission apparatus for a vehicle, which is small in size and light in weight.

In accordance with the present invention which attains the above object, there is provided a power transmission apparatus for a vehicle comprising a first rotary shaft transmitting drive force to front wheels, a secondary rotary shaft transmitting drive force to rear wheels, a hydraulic oil pump connected between the first rotary shaft and the second rotary shaft to be driven according to the difference between the rotation speeds of the first and second rotary shafts thereby delivering hydraulic oil of an amount corresponding to the rotation speed difference, the hydraulic oil pump having at least two ports alternately changed over between the delivery side and the suction side depending on the direction of relative rotation of the first and second rotary shafts, and a hydraulic control circuit including a hydraulic oil passage providing communication of one of the ports with the other and hydraulic control means disposed in the hydraulic oil passage for controlling the pressure of hydraulic oil delivered from the hydraulic oil pump.

DETAILED DESCRIPTION OF THE PREFERRED EMBODIMENTS

Preffered embodiments of the present invention when applied to a vehicle of four-wheel drive type will now be described in detail.

Figure 1:
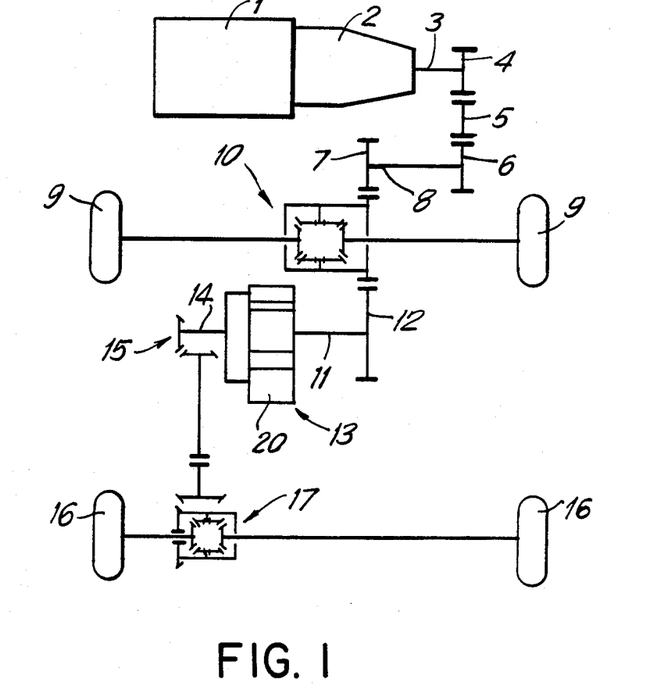
FIG. 1 is a diagrammatic view showing schematically the structure of a vehicle of four-wheel drive type to which the power transmission apparatus of the present invention is applied.

Referring first to FIG. 1 showing the structure of the vehicle of four-wheel drive type to which the present invention is applied, a transmission 2 is connected to an engine 1 having a crankshaft extending in the widthwise direction of the vehicle, and an output shaft 3 of the transmission 2 transmits the drive force to a drive gear 4. From the drive gear 4, the drive force is transmitted through an idle gear 5 to an intermediate transmission shaft 8 having gears 6 and 7 mounted on its both ends respectively. From one of the gears or the gear 7 mounted on one end of the intermediate transmission shaft 8, the drive force is transmitted to a differential unit 10 for front wheels 9 to drive the front wheels 9. On the other hand, the drive force transmitted to the front wheels 9 is directly transmitted through a gear 12 to a first rotary shaft 11. The drive force is then transmitted through a power transmission apparatus 13 to a second rotary shaft 14. The drive force is then transmitted through a gear mechanism 15, which changes the direction of power transmission, to a differntial unit 17 for rear wheels 16 to drive the rear wheels 16.

Figure 2:
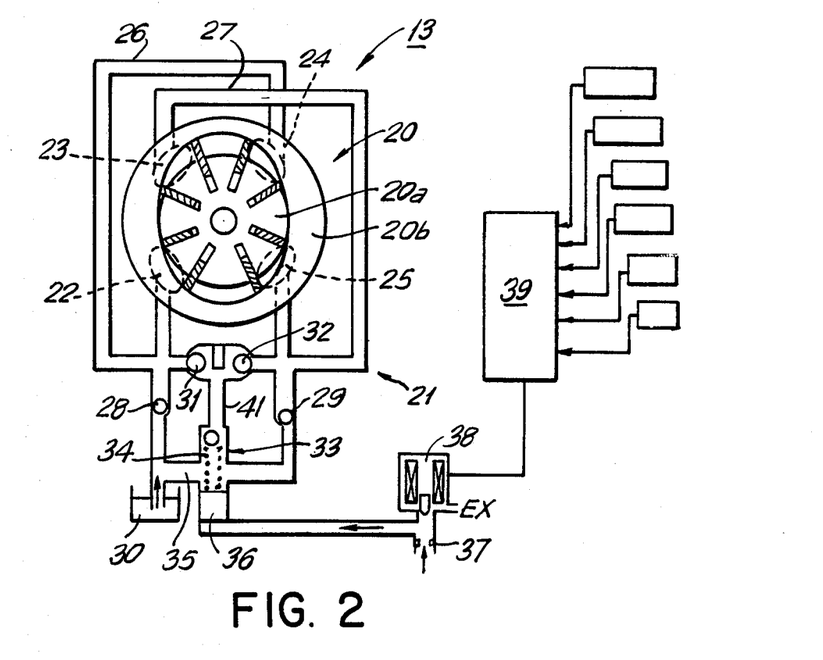
FIG. 2 is a schematic sectional view of a first embodiment of the power transmission apparatus according to the present invention.

A first embodiment of the power transmission apparatus 13 of the present invention will be described with reference to FIG. 2. Referring to FIG. 2, the power transmission apparatus 13 embodying the present invention comprises a hydraulic oil pump in the form of a vane pump 20 and an associated hydraulic control circuit 21. The vane pump 20 includes a rotor 20a and a cam ring 20b. The rotor 20a is coupled to the first rotary shaft 11 to which the drive force transmitted to the front wheels 9 is directly transmitted. The cam ring 20b is coupled to the second rotary shaft 14 transmitted the drive force to the rear wheels 16. The vane pump 20 delivers hydraulic oil of an amount proportional to the rotation speed thereof. More precisely, this vane pump 20 functions as a hydraulic oil pump when there occurs relative rotation between the rotor 20a and the cam ring 20b, that is, when there occurs relative rotation between the first rotary shaft 11 and the second rotary shaft 14. The operation of this vane pump 20 is such that, when ports acting as delivery ports (which are leading ports in the direction of relative rotation) are closed, the rotor 20a and the cam ring 20b are rotated integrally as a rigid body by the action of the static pressure of hydraulic oil. For this purpose, the cam ring 20b is formed with two pump chambers disposed at diagonal positions, and the cam ring 20b is also formed with four ports 22, 23, 24 and 25 disposed at substantially diagonal positions so that trailing and leading ones of them in the direction of relative rotation act as suction ports and delivery ports respectively. The ports 22 and 24 disposed in diagonal relation to perform the same function communicate with each other through a first hydraulic oil passage 26. Also, the ports 23 and 25 disposed in diagonal relation to perform the same function communicate with each other through a second hydraulic oil passage 27. The first and second hydraulic oil passages 26 and 27 are each connected to the associated ports 22, 23, 24 and 25 through a mechanism which permits supply of hydraulic oil even when the cam ring 20b is under rotation.

The first and second hydraulic oil passages 26 and 27 communicate with a hydraulic oil reservoir 30 through a first valve unit or a first check valve 28 and a second valve unit or a second check valve 29 respectively. The two hydraulic oil passages 26 and 27 permit flow of hydraulic oil from the hydraulic oil reservoir 30 only. Further, these hydraulic oil passages 26 and 27 communicate with each other through a pair of opposing selector check valves 31 and 32 which permit flow-out of hydraulic oil from the associated hydraulic oil passages 26 and 27 respectively. The space intermediate between these two check valves 31 and 32 acting as flow selector means communicate with a relief valve 33 disposed in a hydraulic oil delivery passage 41 to act as flow control means. A communication passage 35 extends between an intermediate portion of the relief valve 33 including a valve member having a spring 34 associated therewith and intermediate passage portions between the oil reservoir 30 and the two check valves 28 and 29. A piston 36 is disposed on the other side of the spring 34 for controlling the force of the spring 34 normally applying a pressure in the closing direction of the relief valve 33. The pressure of hydraulic oil which is duty-controlled in a manner as described later acts on the piston 36. For the purpose of the duty control, hydraulic oil at a constant pressure supplied through an orifice 37 is controlled by a solenoid valve 38. This solenoid valve 38 is electrically connected to a computer 39. Signals indicative of the rotation speed of the engine 1, the rotation speed of the first rotary shaft 11, the rotation speed of the second rotary shaft 14, and the throttle opening are applied together with the output signals of a brake actuation detection switch and a steering angle detector to the computer 39 which controls the pressure of hydraulic oil acting on the piston 36. The hydraulic oil at the constant pressure supplied through the orifice 37 may be provided by hydraulic oil used for the control of the transmission 2 when the transmission is of the automatic type or provided by an oil pump when the transmission 2 is of the manual type. Such hydraulic oil may also be provided by hydraulic oil used for power steering, hydraulic oil supplied to the brake booster or hydraulic oil derived from the delivery side of the vane pump 20.

By virtue of such an arrangement of the hydraulic control circuit 21, the pressure of hydraulic oil delivered from the delivery ports of the vane pump 20 acts always on the valve member of the relief valve 33 and the hydraulic oil reservoir 30 communicates with the suction ports of the vane pump 20 regardless of the direction of relative rotation of the rotor 20a and the cam ring 20b.

The function of such a power transmission apparatus 13 will be described with reference to the case where the force urging the relief valve 33 in the open direction against the force of the spring 34 is constant, that is, when the force of the spring 34 only resists the opening movement of the relief valve 33.

In the usual straightforward running state of the vehicle, the effective radius of the tires of the front wheels 9 is the same as that of the rear wheels 16, and the rate of slip of the tires under rotation is quite small. In such a state, there occurs no rotation speed difference between the first rotary shaft 11 and the second rotary shaft 14 of the power transmission apparatus 13. Accordingly, no hydraulic oil under pressure is delivered from the vane pump 20, and no drive force is transmitted to the rear wheels 16. Thus, the vehicle is driven by the front wheels 9 only. That is, the vehicle runs in the two-front-wheel drive mode.

Figure 3A:
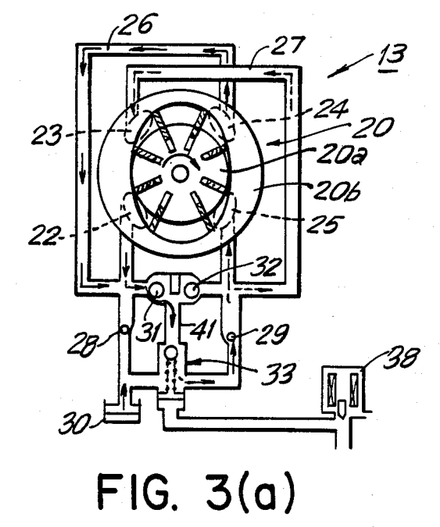
FIGS. 3(a) and 3(b) illustrate the flowing directions of hydraulic oil in the first embodiment respectively.

However, when the vehicle running straightforward is, for example, accelerated, a slip of less than about 1% occurs usually on the front wheels 9 although it is not so appreciable. When there occurs a rotation speed difference between the first and second rotary shafts 11 and 14 due to the above slip of the front wheels 9, the vane pump 20 is energized to build up the pressure corresponding to the above rotation speed difference. The rotor 20a and the cam ring 20b rotate integrally, and the drive force corresponding to the built-up pressure and the pressure receiving area of the vanes is transmitted to the rear wheels 16 to establish the four-wheel drive mode. The flow of hydraulic oil in the vane pump 20 in this case is as shown in FIG. 3(a). It will be seen in FIG. 3(a) that, due to the rotation of the rotor 20a relative to the cam ring 20b, the ports 23 and 25 act as the hydraulic oil suction ports, and hydraulic oil is sucked from the hydraulic oil reservoir 30 into the suction ports 23 and 25 through the check valve 29. On the other hand, the ports 22 and 24 act as the delivery ports to close the check valve 28 and selector check valve 32, and, at the same time, delivered hydraulic oil is fed through the selector check valve 31 toward the relief valve 33. In FIG. 3(a), the solid and broken lines with arrows indicate the flowing directions of delivered and sucked hydraulic oil respectively.

Suppose then that the rotation speed of the front wheels 9 becomes very high compared with that of the rear wheels 16 as, for example, when the vehicle runs on a snow-laden road or is abruptly accelerated or abruptly braked resulting in locking of the rear wheels 16. In such a case, the rotation speed difference between the first and second rotary shafts 11 and 14 in the power transmission apparatus 13 becomes very large. Consequently, a high pressure is generated in the vane pump 20, and such hydraulic oil flows in the directions shown in FIG. 3(a). When the pressure of hydraulic oil exceeds a predetermined level, the relief valve 33 is opened against the force of the spring 34, and the pressure of delivered hydraulic oil is controlled to be substantially constant. Thus, a constant drive force corresponding to the regulated pressure of delivered hydraulic oil is transmitted to the rear wheels 16 to establish the four-wheel drive mode. Consequently, the rotation speed of the front wheels 9 is decreased, while that of the rear wheels 16 is increased, so that the rotation speed difference between the front and rear wheels 9 and 16 is reduced. (This function is the same as that of the non-slip differntial unit.) Thus, when a slip occurs on the front wheels 9, the driving torque for the rear wheels 16 is increased to avoid the impossibility of running, while, when the rear wheels 16 tend to be locked, the braking torque for the front wheels 9 is increased to prevent locking of the rear wheels 16.

Figure 3B:
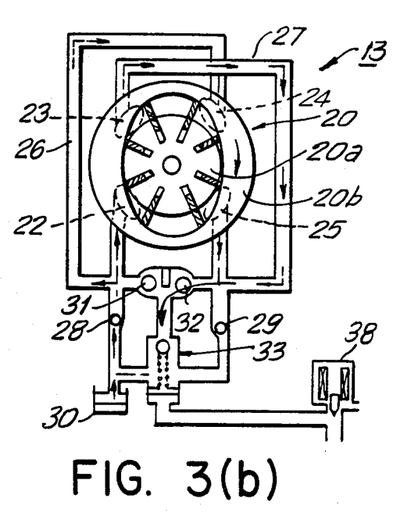

Suppose further the case where the rotation speed of the rear wheels 16 is very high compared with that of the front wheels 9 as, for example, when the front wheels 9 tend to be locked due to application of the brakes. In such a case, a very large difference appears between the rotation speeds of the first and second rotary shafts 11 and 14 of the power transmission apparatus 13 in a direction opposite to the aforementioned direction. Consequently, the flow of hydraulic oil in the vane pump 20 is now as shown in FIG. 3(b). It will be seen in FIG. 3(b) that the ports 22 and 24 act as hydraulic oil suction ports, and hydraulic oil is sucked from the hydraulic oil reservoir 30 into the suction ports 22 and 24 through the check valve 28, while, on the other hand, the ports 23 and 25 act as hydraulic oil delivery ports. Accordingly, hydraulic oil flowing through the second hydraulic oil passage 27 closes the check valve 29 and selector check valve 31, and, at the same time, hydraulic oil at a high pressure fed from the second hydraulic oil passage 27 flows through the selector check valve 32 toward the relief valve 33. Since the pressure of such hydraulic oil is also maintained constant by the relief valve 33, the corresponding constant drive force is transmitted to the rear wheels 16 to establish the four-wheel drive mode. As a result, the braking torque imparted to the rear wheels 16 is increased to prevent locking of the front wheels 9.

In a usual running state of the vehicle running along a curve, the rotation speed of the front wheels 9 is slightly higher than that of the rear wheels 16, and the vehicle runs along the curve in the four-wheel drive mode in which the braking torque is imparted to the front wheels 9, while the driving torque is imparted to the rear wheels 16.

In the manner described above, the delivery pressure of hydraulic oil is controlled so as not exceed a constant value by the relief valve 33 in the power transmission apparatus 13. Therefore, in contrast to the prior art case where the driver's manipulation is required to establish the four-wheel drive mode in a vehicle of the part-time four-wheel drive type, the change-over between the four-wheel drive mode and the two-wheel drive mode can be automatically effected, and the four-wheel drive mode is established by the drive force corresponding to the rotation speed difference between the front and rear wheels, according to the present invention. Also, when compared with the center differential unit necessarily provided in a vehicle of the full-time four-wheel drive type, the power transmission apparatus 13 according to the present invention is small in size, compact in structure, light in weight and low in cost.

As described already, the pressure of hydraulic oil acting on the lower end of the piston 36 is duty-controlled to regulate the force required for opening the relief valve 33. By so regulating, the pressure of hydraulic oil delivered from the vane pump 20 can be regulated or controlled, and the drive force transmitted to the rear wheels 16 can be regulated.

Therefore, the manner of duty control may be such that, when a heavier load of the engine 1 is sensed on the basis the output signal of the throttle opening sensor, the pressure of hydraulic oil delivered from the vane pump 20 is correspondingly increased, so that the vehicle can run in the four-wheel drive mode in which the drive force transmitted to the rear wheels 16 is increased correspondingly. Further, the manner of duty control may be such that the pressure of hydraulic oil delivered from the vane pump 20 is increased when the output signal of the brake actuation detection switch sensing the state of actuation of the foot brake indicates turn-on of this switch, locking of the front and rear wheels 9 and 16 can be prevented to shorten the braking distance of the vehicle, and also the vehicle can be stably braked.

Further, the manner of duty control may be such that the pressure of hydraulic oil delivered from the vane pump 20 is decreased with the increase in the steering angle sensed by the steering angle sensor, the vehicle can smoothly run along a curve without giving rise to the tight corner braking phenomenon. Further, the vehicle can stably run when the pressure of hydraulic oil delivered from the vane pump 20 is regulated or controlled depending on the rotation speed of the engine 1 and the velocity of the vehicle sensed on the basis of the sensor output signals applied to the computer 39.

Figure 4:
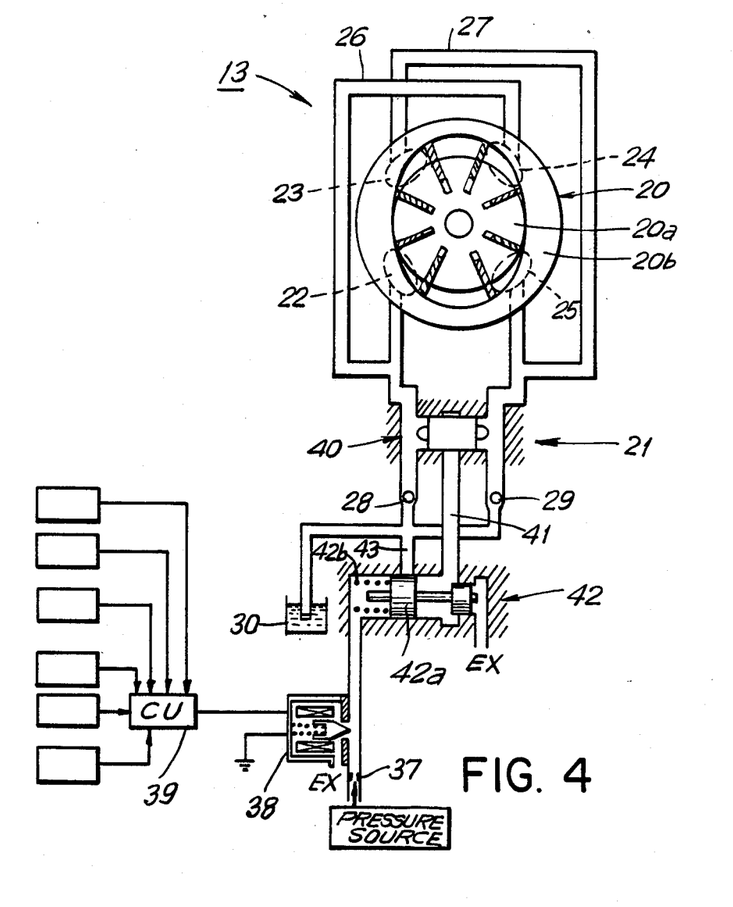
FIG. 4 is a schematic sectional view of a second embodiment of the power transmission apparatus according to the present invention.

A second embodiment of the present invention in which its hydraulic control circuit 21 differs from that employed in the first embodiment will be described with reference to FIG. 4. In FIG. 4, the same reference numerals are used to designate the same parts appearing in FIG. 2. In the power transmission apparatus 13 shown in FIG. 4, the structure of the hydraulic oil pump 20 is the same as that described already. In FIG. 4, the flow selector means or the two selector check valves 31 and 32 [shown in FIGS. 3(a) and 3(b)] disposed between the first and second hydraulic oil passages 26 and 27 of the hydraulic control circuit 21 to permit flow-out of hydraulic oil from the respective hydraulic oil passages 26 and 27 only in the first embodiment are replaced by a single selector valve 40 of spool type. The hydraulic oil passages defined by the both ends of the spool of the selector valve 40 communicate with the first or second hydraulic oil passage 26 or 27 and communicate also with the hydraulic oil reservoir 30 through the check valves 28 and 29 respectively, and a hydraulic oil delivery passage 41 communicates with the intermediate position of the hydraulic oil passages changed over by the spool of the selector valve 40.

The relief valve 33 is replaced by a pressure control valve 42 which includes a spool 42a having spaced two lands. The hydraulic oil delivery passage 41 communicates with the space between the two lands of the spool 42a, and a passage 43 for feeding hydraulic oil at a regulated pressure communicates with the oil reservoir 30 and also with the space between the two lands of the spool 42a. A biasing force of a spring 42b acts on the left-hand end of the spool 42a, and the pressure of hydraulic oil duty-controlled by the combination of the orifice 37 and the solenoid valve 38 acts also on that end. Accordingly, hydraulic oil at a regulated pressure is obtained as a result of a balance between the spool biasing force provided by the combination of the force of the spring 42b and the duty-controlled pressure of hydraulic oil and the spool biasing force corresponding to the differential area of the two lands of the spool 42a to which hydraulic oil is fed from the delivery passage 41. The hydraulic oil at such a regulated pressure is fed into the hydraulic oil passage 43 to be returned to the hydraulic oil passage 26 or 27 connected to the suction ports.

Suppose that the relative rotation speed of the first rotary shaft 11 is higher than that of the second rotary shaft 14. Suppose then, that the rotor 20a rotates clockwise in such a case, as described with reference to FIG. 3(a). Then, according to the arrangement of such a hydraulic control circuit 21, the first and second hydraulic oil passages 26 and 27 are now connected to the delivery and suction ports respectively. As a result, the pressure of delivered hydraulic oil acts on the left-hand end face of the spool of the selector valve 40 to urge this spool to its extreme rightward position, and the first hydraulic oil passage 26 communicates with the delivery passage 41. Therefore, hydraulic oil delivered through the first hydraulic oil passage 26 is fed through the delivery passage 41 toward the pressure control valve 42, and hydraulic oil at the regulated pressure is circulated through the check valve 29 to the suction ports.

Suppose then that the relative rotation speed of the second rotary shaft 14 is higher than that of the first rotary shaft 11. Then, the cam ring 20b rotates clockwise as described with reference to FIG. 3(b), and the second and first hydraulic oil passages 27 and 26 are now connected to the delivery and section ports respectively.

As a result, the pressure of delivered hydraulic oil acts on the right-hand end face of the spool of the selector valve 40 in the hydraulic control circuit 21 in FIG. 4, and this spool is urged to its extreme leftward position to permit communication of the second hydraulic oil passage 27 with the delivery passage 41. Hydraulic oil from the second hydraulic oil passage 27 is fed toward the pressure control valve 42, so that hydraulic oil at the regulated pressure is fed through the check valve 28 to be circulated to the suction ports.

Thus, regardless of the directions of relative rotation of the first and second rotary shafts 11 and 14, delivered hydraulic oil is always fed into the delivery passage 41. Therefore, when the pressure of hydraulic oil acting on the spool 42a of pressure control valve 42 is regulated by the duty-controlled solenoid valve 38, the pressure of hydraulic oil delivered from the hydraulic oil pump 20 can be controlled, so that the drive mode corresponding to the present running state of the vehicle can be established as described already.

Figure 5:
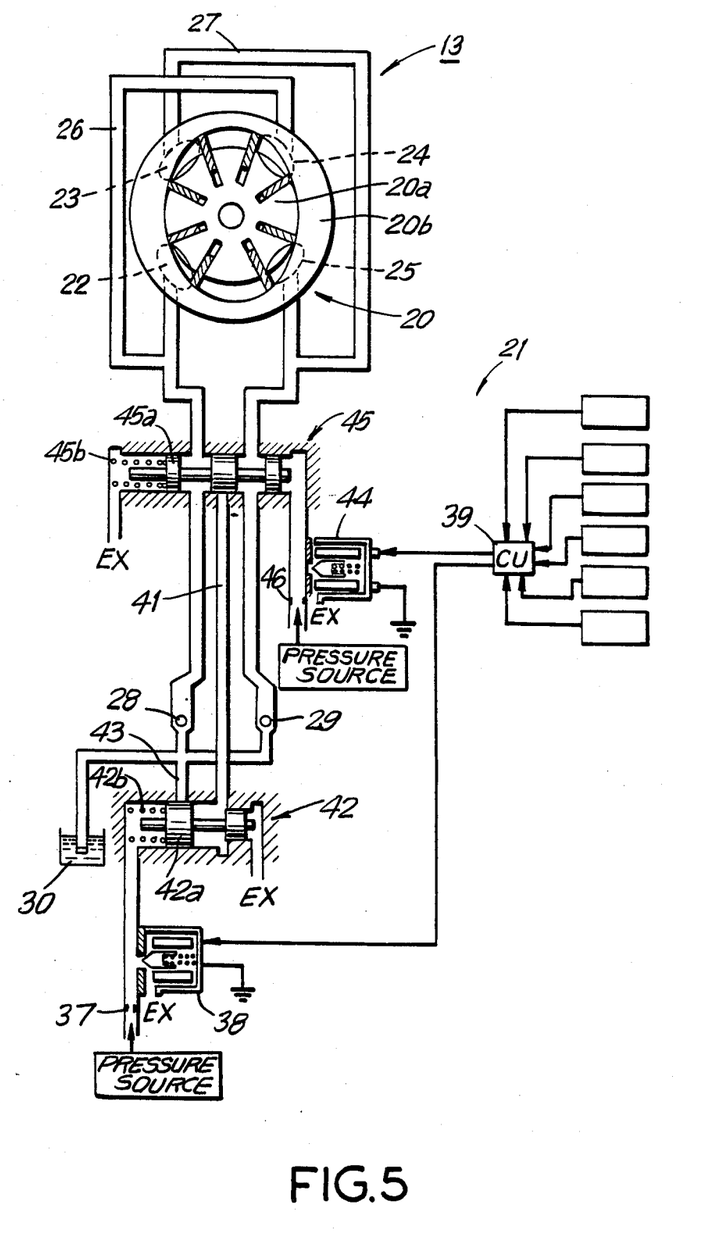
FIG. 5 is a schematic sectional view of a third embodiment of the power transmission apparatus according to the present invention.

A third embodiment of the present invention in which its hydraulic control circuit 21 differs from that employed in the first and second embodiments will be described with reference to FIG. 5. In FIG. 5, the same reference numerals are used to designate the same parts appearing in FIGS. 2 and 4.

In the embodiment shown in FIG. 5, the selector valve 40 employed in the second embodiment is replaced by a spool valve 45 controlled by on-off of a solenoid valve 44. This spool valve 45 includes a spool 45a having three spaced lands. In FIG. 5, the first and second hydraulic oil passages 26 and 27 communicate with the spaces between the three lands of the spool 45a respectively and communicate also with the hydraulic oil reservoir 30 and the regulated hydraulic oil passage 43 from the pressure control valve 42 through the check valves 28 and 29 respectively. The delivery passage 41 communicates with the spool valve 45 to be opened and closed by the central land of the spool 45a, so that the first and second hydraulic oil passages 26 and 27 can also communicate with the pressure control valve 42. A spring 45b is mounted on the left-hand end of the spool 45a of the spool valve 45, and the on-off controlled solenois valve 44 is disposed upstream of an orifice 46 formed in a hydraulic oil passage communicating with the right-hand end of the spool 45a of the spool valve 45. The computer 39 is electrically connected to the solenoid valve 44.

Suppose that the relative rotation speed of the first rotary shaft 11 is higher than that of the second rotary shaft 14, and the rotor 20a rotates clockwise in such a case. Then, as described with reference to FIG. 3(a), the first and second hydraulic oil passages 26 and 27 are connected to the delivery and suction ports respectively in such a hydraulic control circuit 21.

The computer 39 detects the direction of rotation (the direction of relative rotation) of the hydraulic oil pump 20 on the basis of the input signals indicative of the rotation speeds of the first and second rotary shafts 11 and 14. Then, the computer 39 turns on the solenoid valve 44 to open the passage upstream of the orifice 46. The spool 45a of the spool valve 45 is urged to its extreme rightward position by the spool biasing force provided by the combination of the force of the spring 45b and the force corresponding to the differential area of the two lands of the spool 45a to which hydraulic oil is fed from the first hydraulic oil passage 26, thereby establishing communication between the first passage 26 and the delivery passage 41. Hydraulic oil fed into this delivery passage 41 is circulated as in the case of FIG. 4.

Suppose, on the contrary, that the relative rotation speed of the second rotary shaft 14 is higher than that of the first rotary shaft 11, and the cam ring 20b rotates clockwise in such a case. Then, as described with reference to FIG. 3(b), the second and first hydraulic oil passages 27 and 26 are connected to the delivery and suction ports respectively. In such a case, the computer 39 turns off the solenoid valve 44. The pressure of hydraulic oil acts on the right-hand end face of the spool 45a, together with the force corresponding to the differential area of the two lands of the spool 45a to which hydraulic oil is fed from the second hydraulic oil passage 27, thereby urging the spool 45a to its extreme leftward position against the force of the spring 45b, to establish communication between the second passage 27 and the delivery passage 41. Hydraulic oil fed into this delivery passage 41 is circulated as in the case of FIG. 4.

Thus, by virtue of the provision of the spool valve 45 which is changed over under control of the solenoid valve 44, the spool valve 45 can be reliably operated regardless of the direction of relative rotation of the hydraulic oil pump 20.

Figure 6:
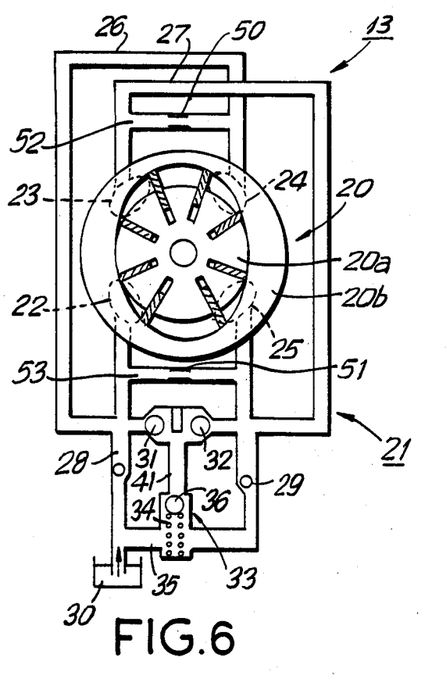
FIG. 6 is a schematic sectional view of a fourth embodiment of the power transmission apparatus according to the present invention.

A fourth embodiment of the present invention in which its hydraulic control circuit 21 differs from that employed in the first embodiment will be described with reference to FIG. 6. In FIG. 6, the same reference numerals are used to designate the same parts appearing in FIG. 2.

In the embodiment shown in FIG. 6, the pressure with which the relief valve 33 is urged to its open position is not controlled by the computer 39 but is set at a predetermined value determined by the force of the spring 34, so that the delivery ports of the vane pump 20 may not communicate with the hydraulic oil reservoir 30 when the pressure of hydraulic oil does not exceed the pressure setting of the relief valve 33. A first auxiliary hydraulic oil passage 52 having a flow restrictor or orifice 50 and a second auxiliary hydraulic oil passage 53 having a flow restrictor or orifice 51 are connected between the ports 23, 24 and between the ports 22, 25 respectively so that the relief valve 33 can achieve the pressure control or regulating function. Thus, the relief valve 33 constitutes hydraulic oil flow control means together with the orifices 50 and 51.

More precisely, flow of hydraulic oil through the auxiliary passages 52 and 53 is usually restricted by the respective orifices 50 and 51. Therefore, when the rotation speed difference between the first and second rotary shafts 11 and 14 is small, the amount of hydraulic oil flowing into the auxiliary passages 52 and 53 is small. With the increase in the rotation speed difference between the first and second rotary shafts 11 and 14, the pressure of hydraulic oil delivered from the vane pump 20 becomes higher until finally it overcomes the resistance of the orifices 50 and 51 against flow. In such a situation, hydraulic oil flows through the auxiliary passages 52 and 53 before the pressure of delivered hydraulic oil attains the control pressure setting of the relief valve 33, thereby to transmit the torque corresponding to the rotation speed difference to the second rotary shaft 14. Thus, the auxiliary passages 52 and 53 act to adjust the pressure control function of the relief valve 33.

Figure 7:
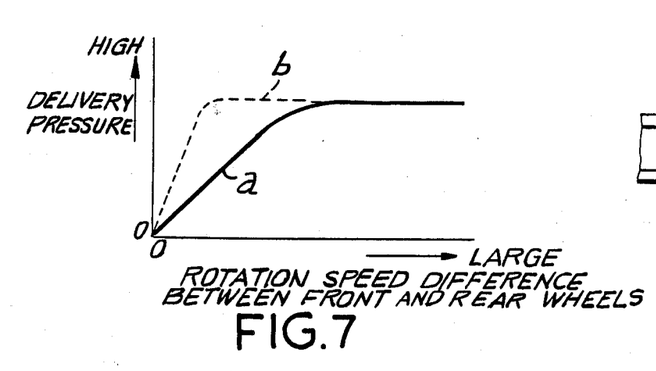
FIG. 7 is a graph showing the delivery pressure of the vane pump relative to the rotation speed difference between the front and rear wheels in the fourth embodiment.

When the rotation speed difference between the front wheels 9 and the rear wheels 16 is small irrespective of the direction of relative rotation of the rotor 20a and cam ring 20b of the vane pump 20, the pressure of hydraulic oil delivered from the vane pump 20 overcomes the flow resistance of the orifices 50 and 51 in such a hydraulic control circuit 21, and hydraulic oil flows through the auxiliary passages 52 and 53 into the suction ports, so that the torque corresponding to the rotation speed difference is transmitted to the rear wheels 16. When on the contrary, the rotation speed difference between the wheels 9 and 16 is large, the hydraulic oil reservoir 30 would not communicate with the suction ports of the vane pump 20 before the pressure of delivered hydraulic oil attains the level exceeding the setting of the spherical valve member 36 of the relief valve 33. The rotation speed difference between the front and rear wheels 9 and 16 relative to the pressure of delivered hydraulic oil is shown in FIG. 7 in which the characteristic curve a represents the relation when the orifices 50 and 51 are provided (that is, when the auxiliary passages 52 and 53 are provided), while the characteristic curve b represents the relation when the orifices 50 and 51 are not provided. It will be seen in FIG. 7 that the pressure of delivered hydraulic oil is lower than the orifices 50 and 51 are provided.

In the power transmission apparatus 13 shown in FIG. 6, the pressure of hydraulic oil delivered from the vane pump 20 is maintained at a predetermined value by the function of the relief valve 33, and the auxiliary passages 52 and 53 having the respective orifices 50 and 51 therein are provided, so that, when the rotation speed difference exceeds a predetermined value which may be small, the torque corresponding to the rotation speed difference can be transmitted to the rear wheels 16. Therefore, the present invention obviates the defect that a large torque is transmitted to the rear wheels 16, in spite of the fact that closure of the hydraulic oil passage results in build-up and increase of the delivery pressure and that the rotation speed difference is not so large. Thus, the torque exactly corresponding to the rotation speed difference can be transmitted to the rear wheels 16.

Figure 8:
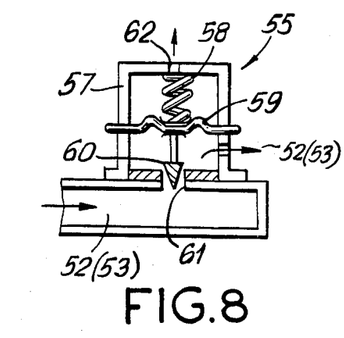
FIG. 8 is a schematic sectional view of part of the hydraulic control circuit in a fifth embodiment of the power transmission apparatus according to the present invention.

A fifth embodiment of the present invention will be described with reference to FIG. 8. In the embodiment shown in FIG. 8, the arrangement of the hydraulic oil pump 20 is the same as that shown in FIG. 6 except that a flow restrictor 55 having a structure as shown is disposed in each of the auxiliary passages 52 and 53 in lieu of the orifices 50 and 51. This flow restrictor 55 is disposed in each of the auxiliary passages 52 and 53 connecting between the delivery and section ports of the hydraulic oil pump 20. The flow restrictor 55 includes a casing 57 disposed between the delivery passage and the suction passage, a needle valve 60 provided in the casing 57 through a spring 58 for openably closing a communication port 61 bored in the wall of the auxiliary passage 52(53), a diaphragm 59 fixed to the needle valve 60 for making expansion and contraction depending on the load of the engine (not shown), and a pressure transmission port 62 bored in the wall of the casing 57 for transmitting the negative pressure in the engine intake manifold to the diaphragm 59.

The larger the torque of the engine, the lower is the negative pressure in the engine intake manifold, and the opening the communication port 61 becomes smaller. However, the communication port 61 is usually maintained in a slightly open condition without being completely closed, and with the decrease in the load of the engine, the communication port 61 is opened wider. On the other hand, with the increase in the load of the engine, the drive force increases correspondingly. The communication port 61 is narrowed by the advancing movement of the needle valve 60 so as to establish the four-wheel drive mode.

Figure 9:
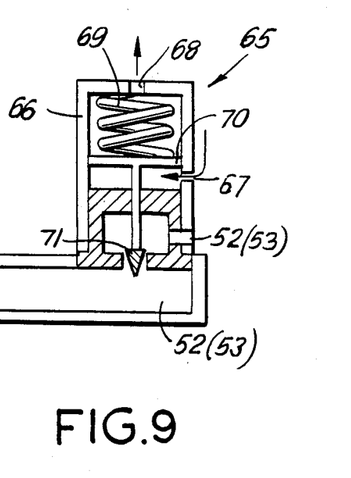
FIG. 9 is a schematic sectional view of part of the hydraulic controly circuit in sixth embodiment of the power transmission apparatus according to the present invention.

A sixth embodiment of the present invention will be described with reference to FIG. 9. In the embodiment shown in FIG. 9, the arrangement of the hydraulic oil pump 20 is the same as that shown in FIG. 6, except that a flow restrictor 65 having a structure as shown is disposed in each of the auxiliary passages 52 and 53 in lieu of the orfices 50 and 51. This flow restrictor 65 is disposed in each of the auxiliary passages 52 and 53 connecting between the delivery and suction ports of the hydraulic oil pump 20. The flow restrictor 65 includes a casing 66 disposed between the delivery passage and the suction passage. A pressure transmission port 67 is bored in the wall of the casing 66 for transmitting the pressure of hydraulic oil delivered from the oil pump of the power steering mechanism provided for the handle, and another pressure transmission port 68 is bored in the wall of the casing 66 for transmitting the negative pressure in the engine intake manifold. A piston 70 loaded with a spring 69 is mounted between the manifold pressure transmission port 67 and the oil pump delivery pressure transmission port 68 in the casing 66 so as to make vertical movement under influence of the oil pump delivery pressure and the manifold pressure. A needle valve 71 for opening and closing the auxiliary passage 52(53) is fixed to the lower end of the piston 70.

The larger the steering angle, the oil pressure of the power steering mechanism becomes higher. In such a case, the needle valve 71 in the flow restrictor 65 of the above structure makes retracting movement to widely open the auxiliary passage 52(53) thereby increasing the allowance for the rotation speed difference between the front and rear wheels 9 and 16. On the other hand, when there occurs a large rotation speed difference between the front and rear wheels 9 and 16 in the straightforward running state of the vehicle, this allowance for the rotation speed difference is cancelled, and the required torque is transmitted to the front wheels 9.

Further, the negative pressure in the intake manifold which is transmitted through the pressure transmission port 68 to open and close the auxiliary passage 52(53) may be arranged, to act in interlocking relation with the engine torque, so that the drive mode of the vehicle can be suitably changed over to the four-wheel drive mode depending on the relative magnitudes of the engine torque and steering angle.

it is to be noted herein that the spring 69 incorporated in the flow restrictor 65 should be considerably strong since there is a very great difference between the intake manifold pressure and the power steering oil pressure.

Means for variably restricting the flow of hydraulic oil through the auxiliary passages 52 and 53 depending on the running conditions of the vehicle may also be employed for attaining the object similar to that described above. For example, the flow of hydraulic oil through the auxiliary passages 52 and 53 may be suitably restricted depending on the brake oil pressure or depending on whether or not the accelerator pedal is released. Further, the flow of hydraulic oil through the auxiliary passages 52 and 53 may be suitably restricted for the purpose of control depending on the running speed of the vehicle, the angular velocity of steering, etc.

A seventh embodiment of the present invention will be described with reference to FIG. 10 in which the pressure of hydraulic oil delivered from the hydraulic oil pump or vane pump 20 is utilized for biasing the vanes of the vane pump 20.

Figure 10:
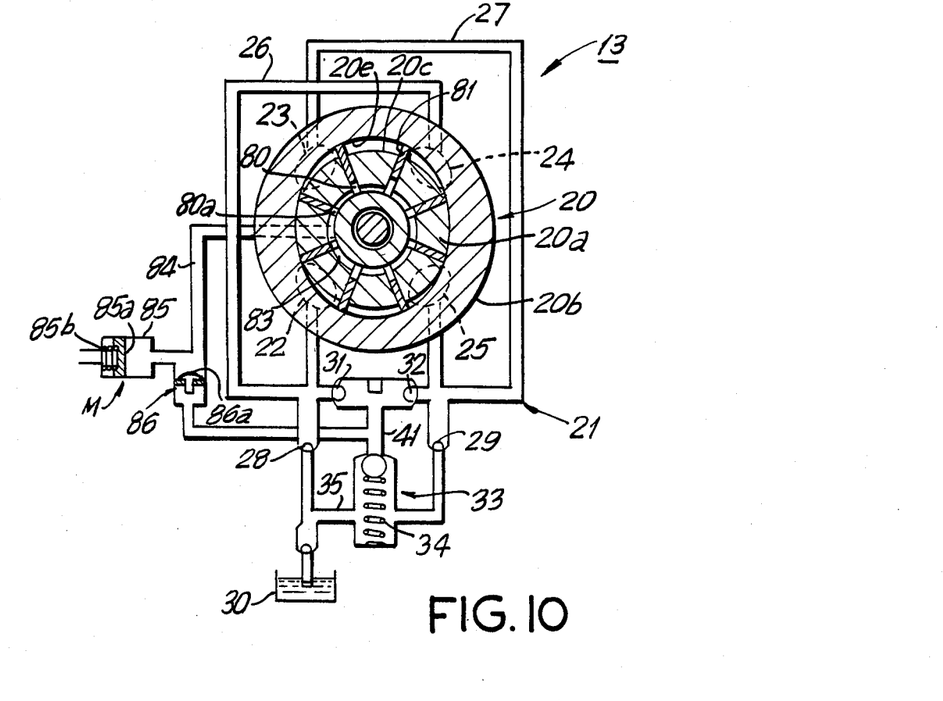
FIG. 10 is a schematic sectional view of a seventh embodiment of the power transmission apparatus according to the present invention.

Referring to FIG. 10, the hydraulic oil pump or vane pump 20 is formed with a plurality of, or, for example, eight radial slots 80 in equally circumferentially spaced apart relation along the outer peripheral surface 20c of the rotor 20a, and, in each of these slots 80, a vane 81 is inserted so as to make sliding engagement with the inner peripheral surface 20e of the cam ring 20b.

In this embodiment, the vanes 81 of the vane pump 20 are normally biased toward and onto the inner peripheral surface 20c of the cam ring 20b by a hydraulic oil supply unit M acting as a vane biasing unit. More precisely, the rotor 20a is formed with an annular recess 83 communicating with the bottom (the radially inner end) of the slots 80, and this annular recess 83 communicates through a hydraulic oil passage 84 to an accumulator 85 including a piston 85a urged by a spring 85b. A check valve 86 having a parasol-shaped valve member 86a is disposed in the passage 84 which is connected to the hydraulic oil delivery passage 41.

According to the above arrangement, the vanes 81 make sliding engagement with the inner peripheral surface 20e of the cam ring 20b by being urged by the working oil of high pressure accumulated in the accumulator 85, when the pressure of hydraulic oil drops due to a decrease in the rotation speed difference between the rotor 20a and the cam ring 20b, and the check valve 86 is urged to its closed position. Therefore, even when the relative rotation between the rotor 20a and the cam ring 20b is ceased as a result of the stoppage of the vehicle, the vanes 81 are still urged toward and onto the inner peripheral surface 20e of the cam ring 20b, so that the coupling function of the vane pump 20 is sufficiently maintained.

Figure 11:
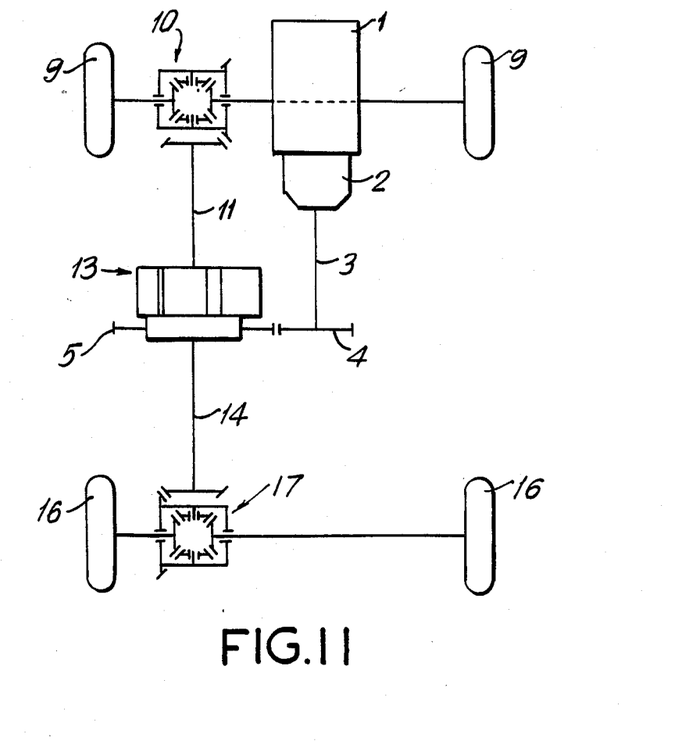
FIG. 11 is a diagrammatic view showing the structure of another vehicle of four-wheel drive type to which the power transmission apparatus of the present invention is applied.

The power transmission apparatus according to the present invention is not only applicable to the vehicle of four-wheel drive type shown in FIG. 1, but also applicable to, for example, another vehicle of four-wheel drive type as shown in FIG. 11.

Referring to FIG. 11 showing an application of an eighth embodiment of the present invention, a transmission 2 is connected to an engine 1, having a crankshaft extending in the longitudinal direction of the vehicle, and an output shaft 3 of the transmission 2 transmits the drive force to a drive gear 4. From the drive gear 4, the drive force is transmitted to a second rotary shaft 14 through a driven gear 5. From the second rotary shaft 14, the drive force is transmitted to a differential unit 17 for rear wheels 16 so that the rear wheels 16 are driven directly from the engine 1 through the aforementioned power train. On the other hand, the drive force transmitted to the second rotary shaft 14 is transmitted through the power transmission apparatus 13 of the present invention to a first rotary shaft 11, and this drive force is transmitted to a differential unit 10 for front wheels 9, so that the front wheels 9 are indirectly driven through the power transmission apparatus 13 by the drive force driving the rear wheels 16. The rotor 20a of the vane pump 20 (not shown) is coupled to the second rotary shaft 14 to which the drive force driving the rear wheels 16 is transmitted intact, and the cam ring 20b of the vane pump 20 is coupled to the first rotary shaft 11 transmitting the drive force to the front wheels 9.

According to such an arrangement, a relatively large drive force is applied to the rear wheels 16 where the grip limit torque becomes large due to the distribution of a greater proportion of the vehicle weight during an abrupt acceleration. Therefore, the power of the engine can be effectively utilized to exhibit an excellent acceleration performance. Further, since only the engine torque portion exceeding the grip limit of the rear wheels giving rise to a slip is transmitted to the front wheels 9 by the vane pump 20, the torque transmission capacity of the vane pump 20 need not be large.

Further, since the drive force is distributed to the rear wheels 16 in a greater proportion than the front wheels 9 by being limited by the torque transmission capacity of the vane pump 20, the force gripping the front wheels 9 which are the steering wheels can be maintained to be high enough for improving the steering performance.

A ninth embodiment of the present invention in which the vane pump is replaced by a gear pump will be described with reference to FIGS. 12 to 14.

Figure 12:
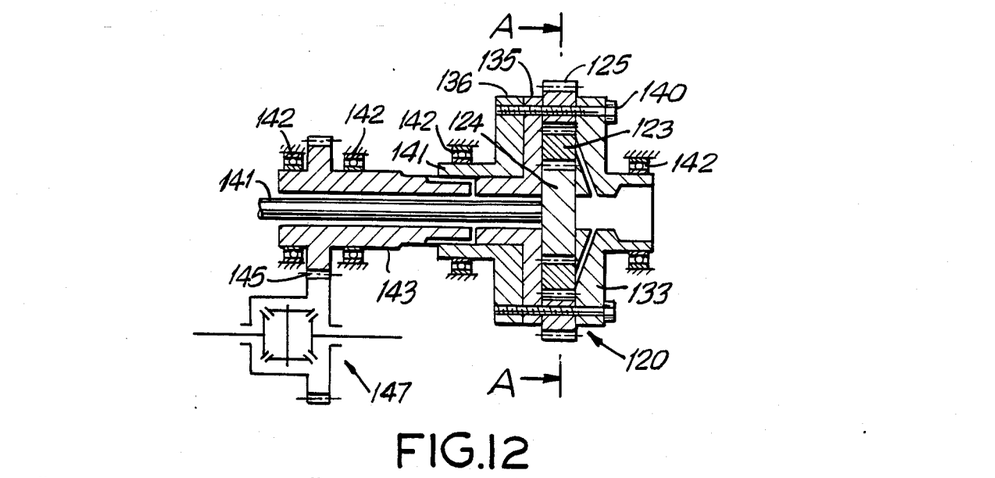
FIG. 12 is an axial sectional view of a gear pump incorporated in a ninth embodiment of the power transmission apparatus according to the present invention.
Figure 13:
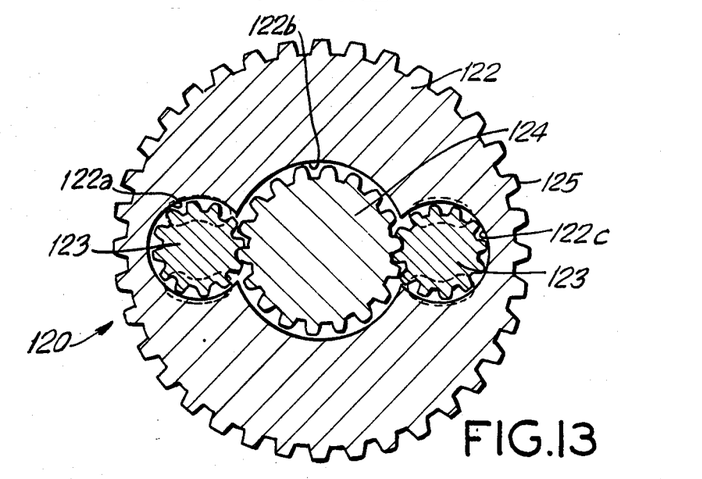
FIG. 13 is a sectional view taken along the line A—A in FIG. 12.
Figure 14:
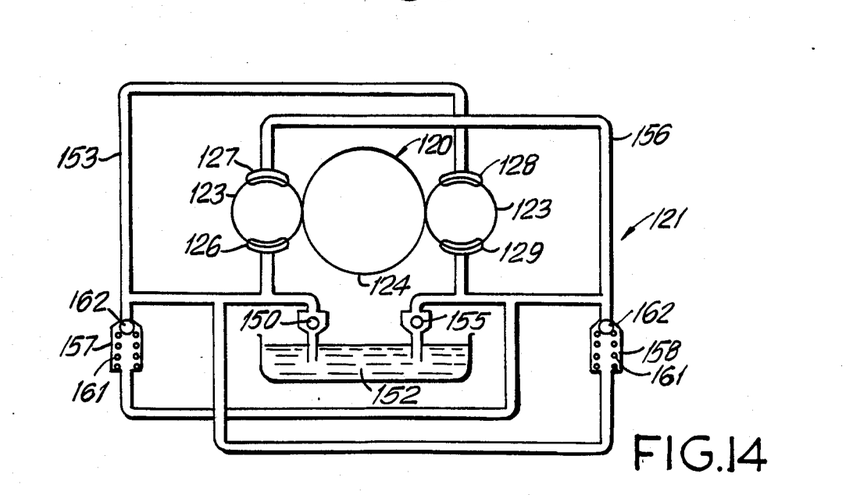
FIG. 14 is a diagrammatic view showing schematically the structure of the hydraulic control circuit in the ninth embodiment.

Referring to FIGS. 12 to 14, the power transmission apparatus in this embodiment ecomprises a gear pump 120 and a hydraulic control circuit 121 associated with the gear pump 120.

The gear pump 120 includes a housing 122 formed with cylindrical cavities 122a, 122b and 122c. A first pinion gear 123, a sun gear 124, and a second pinion gear 123 making meshing engagement with each other are received in these cavities 122a, 122b and 122c respectively, and the two pinion gears 123 and the single sun gear 124 constitute two pumps. A gear 125 is formed on the outer periphery of the housing 122 to transmit power to a first rotary shaft 143 described later.

Ports 126, 127, 128 and 129 communicating with the gear pump 120 are formed in one of the side walls of the housing 122, and a casing 133 formed with hydraulic oil passages communicating with these ports 126, 127, 128 and 129 is provided on that side wall. A first cover 135 is provided on the other side wall of the housing 122, and a second cover 136 is provided outside the first cover 135. All of the casing 133, first cover 135 and second cover 136 are fastened to the housing 122 by bolts 140. A spline 141 is formed on the inner peripheral surface of the end portion of the second cover 136, and, by the spline 141, the second cover 136 is coupled to a first rotary shaft 143 transmitting the drive force to the front wheels 9. This first rotary shaft 143 is hollow and has a gear portion 145 which is coupled to a differential unit 147 for the front wheels 9, so that the drive force can be transmitted to the front wheels 9 from the first rotary shaft 143.

A second rotary shaft 149 transmitting the drive force to the rear wheels 16 extends loosely through the first rotary shaft 143, first cover 135 and second cover 136.

This second rotary shaft 149 is positioned in a relation coaxial with the rotation axis of the sun gear 124 to be coupled to the sun gear 124. Bearings 142 are provided so as to freely rotatably support the gear pump 120, etc. within the transmission casing.

The operation of the gear pump 120 is similar to that of the aforementioned vane pump 20. When a relative rotation speed difference occurs between the first and second rotary shafts 143 and 149, the sun gear 124 and two pinion gears 123 function as the gear pump. When the ports acting as delivery ports among the ports 126, 127, 128 and 129 are closed, the sun gear 124 and pinion gears 123 rotate unitarily so that the housing 122 can rotate in unitary relation with the sun gear 124.

The hydraulic control circuit 121 is shown in FIG. 14.

Referring to FIG. 14, the hydraulic control circuit 121 includes a first hydraulic oil passage 153 providing communication between the ports 126 and 128 of the gear pump 120 and communicating with a hydraulic oil reservoir 152 through a first check valve 150, a second hydraulic oil passage 156 providing communication between the ports 127 and 129 of the gear pump 120 and communicating with the reservoir 152 through a second check valve 155, a first relief valve 157 permitting flow of hydraulic oil from the first passage 153 to the second passage 156 only, and a second relief valve 158 permitting flow of hydraulic oil from the second passage 156 to the first passage 153 only. Each of the first and second relief valves 157 and 158 includes a valve member 162 biased by a compression spring 161 which controls the pressure with which the valve is urged to open position. These first and second relief valves 157 and 158 constitute flow selector means and flow rate control means.

It is apparent that the operation and effect of the power transmission apparatus including the gear pump 120 described above with reference to FIGS. 12 to 14 are equivalent to those of the power transmission apparatus including the vane pump 20.

Although a vane pump or a gear pump has been illustrated as an example of the hydraulic oil pump preferably employed in the aforementioned embodiments of the present invention, and, in the case of the vane pump, that of balanced type having four ports alternately acting as delivery and suction ports has been referred to by way of example, it is apparent that a vane pump of unbalanced type having two ports alternately acting as delivery and suction ports may also be employed depending on the quantity of transmitted drive force, and a hydraulic oil pump of any other suitable type such as a trochoid pump, a hypocycloid pump, an axial plunger pump or a radial plunger pump may be also employed. It is the only essential requirement that the pump is of the type which delivers an amount of hydraulic oil corresponding to the rotation speed difference. The transmission may be any one of the manual type and the automatic type. Also, the manner of control of the relief valve is in no way limited to the duty control and may be any other suitable type of mechanical control.

The present invention is in no way limited to its application to a vehicle of four-wheel drive type and can also be utilized for power transmission to front and rear wheels of a vehicle of six-wheel drive type. The present invention can also be utilized for power transmission to front-side front and rear wheels of a vehicle of front two-axle drive type and for power transmission to rear-side front and rear wheels of a vehicle of rear two-axle drive type.

It will be understood from the foregoing detailed description that the present invention provides a power transmission apparatus for a vehicle, which comprises a first rotary shaft transmitting power to front wheels, a second rotary shaft transmitting power to rear wheels, and a hydraulic oil pump connected between the first rotary shaft and the second rotary shaft to be driven according to the difference between the rotation speeds of the first and second rotary shafts thereby delivering hydraulic oil of an amount corresponding to the rotation speed difference. The hydraulic oil pump transmits the drive force with the sttic pressure of delivered hydraulic oil to establish the four-wheel drive mode and has delivery ports and suction ports automatically changed over depending on the direction of relative rotation of the first and second rotary shafts. Therefore, the four-wheel drive mode can be established without requiring any manipulation by the driver. Thus, the present invention can obviate the trouble such as the tight corner braking phenomenon encountered with the vehicle of the part-time four-wheel drive type while, at the same time, eliminating the troublesome driver's manipulation for driving. The power transmission apparatus of the present invention has the advantages of small size, light weight, simple construction and low cost over the conventional center differential unit equipped in the vehicle of full-time four-wheel drive type.

We claim:

1. A power transmission apparatus for a vehicle comprising a first rotary shaft transmitting drive force to front wheels, a second rotary shaft transmitting drive force to rear wheels, a hydraulic oil pump connected between said first rotary shaft and said second rotary shaft to be driven according to the difference between the rotation speeds of said first and second rotary shafts thereby delivering hydraulic oil of an amount corresponding to the rotation speed difference, said hydraulic oil pump having at least two ports alternately changed over between the delivery side and the suction side depending on the direction of relative rotation of said first and second rotary shafts, and a hydraulic control circuit including a hydraulic oil passage providing communication of one of said ports with the other and hydraulic control means disposed in said hydraulic oil passage for controlling the pressure of hydraulic oil delivered from said hydraulic oil pump.

2. A power transmission apparatus as claimed in claim 1, wherein said first rotary shaft is coupled to the vehicle's engine so that said front wheels can be directly driven by said engine.

3. A power transmission apparatus as claimed in claim 1, wherein said second rotary shaft is coupled to the vehicle's engine so that said rear wheels can be directly driven by said engine.

4. A power transmission apparatus as claimed in claim 1, wherein said hydraulic oil pump is a vane pump including a cam ring and a rotor.

5. A power transmission apparatus as claimed in claim 4, wherein said first rotary shaft is coupled to the rotor of said vane pump, and said second rotary shaft is coupled to the cam ring of said vane pump.

6. A power transmission apparatus as claimed in claim 4, wherein said vane pump includes two pump chambers.

7. A power transmission apparatus as claimed in claim 1, wherein said hydraulic oil passage in said hydraulic control circuit includes a first hydraulic oil passage communicating with one of said ports and having a first valve unit permitting flow of hydraulic oil into said hydraulic oil pump only, a second hydraulic oil passage communicating with the other of said ports and having a second valve unit permitting flow of hydraulic oil into said hydraulic oil pump only, a first communication passage capable of establishing communication of said second hydraulic oil passage with the portion of said first hydraulic passage between one of said ports and said first valve unit, and a second communication passage capable of establishing communication of said first hydraulic oil passage with the portion of said second hydraulic oil passage between the other of said ports and said second valve unit, and wherein said hydraulic control circuit includes selector means for changing over between said first communication passage and said second communication passage.

8. A power transmission apparatus as claimed in claim 1, wherein said hydraulic oil passage in said hydraulic control circuit includes a first hydraulic oil passage communicating at one end thereof with one of said ports and having a first valve unit permitting flow of hydraulic oil into said hydraulic oil pump only, a second hydraulic oil passage communicating at one end thereof with the other of said ports and having a second valve unit permitting flow of hydraulic oil into said hydraulic oil pump only, and a delivery passage capable of providing communication between the other end of said first hydraulic oil passage and the other end of said second hydraulic oil passage, and wherein said hydraulic control circuit includes selector means for selectively establishing communication of the other end of said first hydraulic oil passage and the other end of said second hydraulic oil passage with said delivery passage.

9. A power transmission apparatus as claimed in claim 7 or 8, wherein said selector means operates to permit delivery of hydraulic oil from said hydraulic oil pump.

10. A power transmission apparatus as claimed in claim 8, wherein said hydraulic control means is disposed in said delivery passage.

11. A power transmission apparatus as claimed in claim 8, wherein said hydraulic control means includes flow restricting means disposed in an auxiliary passage providing communication of the portion of said first hydraulic oil passage between said first valve unit and one of said ports with the portion of said second hydraulic oil passage between said second valve unit and the other of said ports, and a valve member disposed in said delivery passage and biased by biasing means.

12. A power transmission apparatus as claimed in claim 7, wherein said hydraulic control means is disposed in each of said first communication passage and said second communication passage.

13. A power transmission apparatus as claimed in claim 1, wherein said hydraulic control means includes a valve member biased by baising means.

14. A power transmission apparatus as claimed in claim 1, wherein said hydraulic control means is controlled depending on the operation parameter of the vehicle.

15. A power transmission apparatus as claimed in claim 14, wherein said operation parameter is the rotation speed of the engine of the vehicle.

16. A power transmission apparatus as claimed in claim 14, wherein said operation parameter is the rotation speed of said first rotary shaft.

17. A power transmission apparatus as claimed in claim 14, wherein said operation parameter is the rotation speed of said second rotary shaft.

18. A power transmission apparatus as claimed in claim 14, wherein said operation parameter is the throttle opening.

19. A power transmission apparatus as claimed in claim 14, wherein said operation parameter is the degree of brake actuation.

20. A power transmission apparatus as claimed in claim 14, wherein said operation parameter is information indicative of the rate of steering.

21. A power transmission apparatus as claimed in claim 1, wherein said hydraulic control means includes flow restricting means.

22. A power transmission apparatus as claimed in claim 21, wherein said flow restricting means is an orifice.

23. A power transmission apparatus as claimed in claim 21, wherein said flow restricting means is controlled depending on the negative pressure in the intake manifold of the vehicle's engine.

24. A power transmission apparatus as claimed in claim 21, wherein said flow restricting means is controlled depending on the delivery pressure of an oil pump in a power steering mechanism.

25. A power transmission apparatus as claimed in claim 21, wherein said flow restricting means is controlled depending on both the negative pressure in the intake manifold of the engine and the delivery pressure of an oil pump in a power steering mechanism.

26. A power transmission apparatus as claimed in claim 1, wherein said hydraulic control means includes a valve member biased by biasing means, and flow restricting means.

27. A power transmission apparatus as claimed in claim 1, wherein said hydraulic oil pump is a gear pump.

28. A power transmission apparatus as claimed in claim 27, wherein said gear pump includes a rotatable housing coupled to said first rotary shaft, a sun gear rotatably supported in said housing and coupled to said second rotary shaft, and a pinion gear rotatably supported in said housing and making meshing engagement with said sun gear.

29. A power transmission apparatus as claimed in claim 28, wherein a gear is formed on the outer periphery of said housing for power transmission to said first rotary shaft.

* * * * *